(No Model.)
C. S. HUNTER.
SAMPLING DEVICE FOR BALED MATERIAL.
No. 473,316. Patented Apr. 19, 1892.
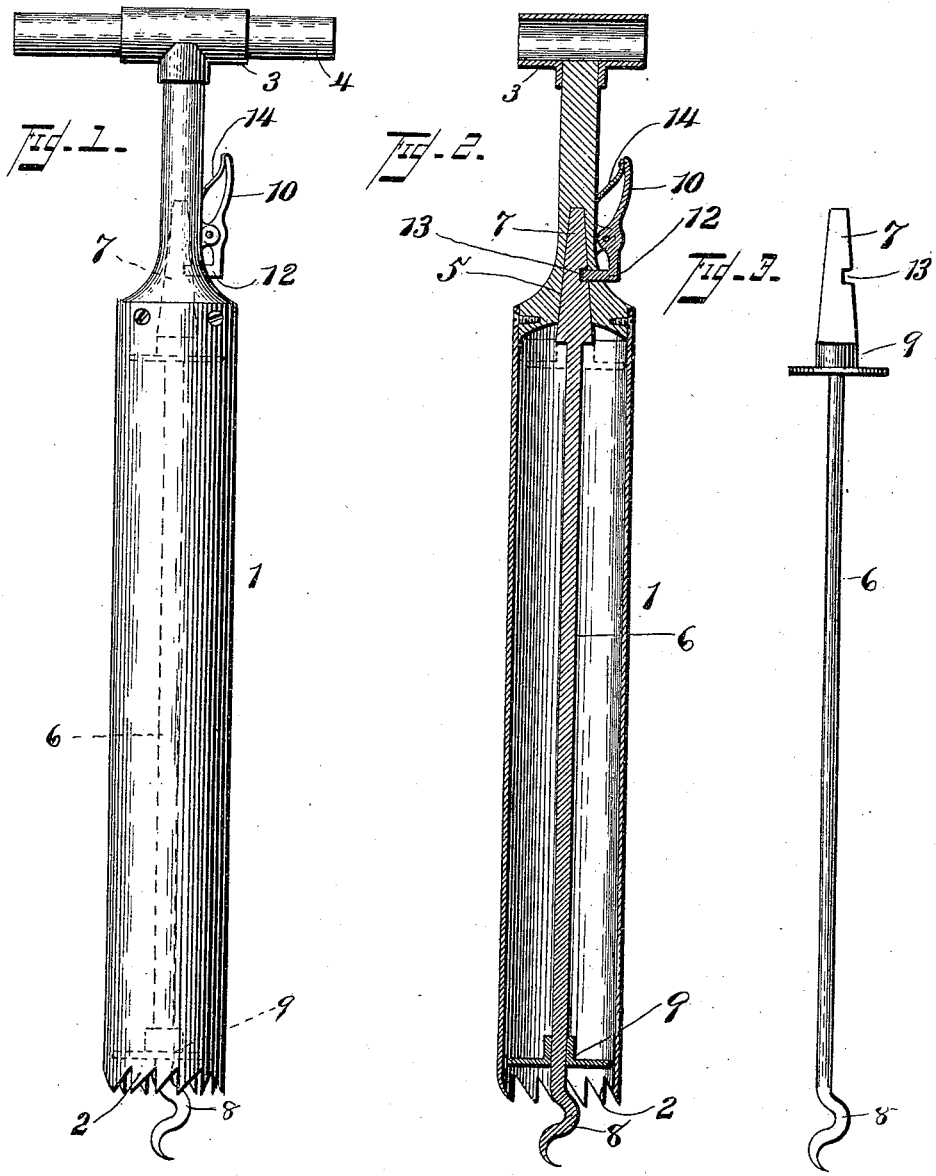

UNITED STATES PATENT OFFICE.

CHARLES S. HUNTER, OF ROCK CREEK, KANSAS.

SAMPLING DEVICE FOR BALED MATERIAL.

SPECIFICATION forming part of Letters Patent No. 473,316, dated April 19, 1892.

Application filed November 24, 1891. Serial No. 412,966. (No model.)

*To all whom it may concern:*

Be it known that I, CHARLES S. HUNTER, a citizen of the United States, and a resident of Rock Creek, in the county of Jefferson and State of Kansas, have invented certain new and useful Improvements in Sampling Devices for Baled Materials; and I do hereby declare that the following is a full, clear, and exact description of the invention, which will enable others skilled in the art to which it appertains to make and use the same, reference being had to the accompanying drawings, which form a part of this specification.

My invention relates to an improved device for use in connection with baled hay, cotton, and other similar material, whereby the quality, grade, and condition of the material in the interior of the bale may be readily ascertained without removing the fastening bands, straps, or ropes.

As is well known to dealers in baled hay, straw, and other compressed fibrous materials, it frequently happens through design or accident that the interior of the bale is of an inferior quality or in a damaged condition, thus frequently causing loss to the purchaser, owing to his inability to ascertain the state or condition of the interior of the bale.

The object of my invention is to provide an improved device by means of which a portion of the interior of a bale of hay or other material may be removed for inspection; and the invention consists in the novel construction and combination of parts hereinafter described and claimed.

In the accompanying drawings, Figure 1 is a side elevation of a device constructed in accordance with my invention. Fig. 2 is a central vertical section of the same. Fig. 3 is an elevation of the central screw-pointed rod or shaft detached.

In the said drawings the reference-numeral 1 denotes a hollow cylinder or tube having one end formed with a series of saw-teeth 2, while its other end is firmly secured to a head or bar 3, provided with handles 4 and having a tapering angular recess 5 at its lower end. The numeral 6 denotes a rod or shaft having at one end an enlarged tapering angular head 7, which is adapted to fit in the recess 5. At its other end this rod is formed with a screw or auger point 8. Loosely mounted upon this rod is an annular disk 9, which is adapted to slide up and down thereon and which serves as a guide or bearing for the rod.

Pivoted to the head or bar 3 is a thumb-lever 10, having at one end an inwardly-projecting lug 12, which extends through an aperture in the head and engages with a recess 13 in the tapering head 7 of the rod 6. A spring 14 is interposed between the opposite end of the lever and the head or bar 3.

The operation is as follows: The screw-rod and tube are screwed into the bale to be tested by rotating the same, the saw-teeth 2, cutting away the material, forming a core, which will be forced into the interior of the tube as the work progresses, carrying with it the disk 9. After the instrument has penetrated the bale to the proper or desired depth, it is withdrawn therefrom and the lug 12 on the lever 10 disengaged from the recess in the head 7 of the rod 6. This rod can now be withdrawn from the tube 1, carrying with it the core of material cut from the bale, which can be inspected and its character and condition ascertained.

Having thus described my invention, what I claim is—

1. As an improved article, a sampler for baled material, comprising a tube having a series of saw-teeth at one end and a head or bar at the opposite end, having an angular recess therein, and a removable rod having an angular head adapted to fit in said recess, and a screw-point, substantially as described.

2. In a sampler for baled material, the combination, with the tube having a series of saw-teeth at one end and the head or bar secured to the other end thereof, having an angular recess, of the rod having an angular end fitting in said recess, and a screw-point, and the slidable disk, substantially as described.

3. In a sampler for baled material, the combination, with the tube having a series of saw-teeth at one end and the head or bar secured to the other end thereof, having an angular recess and an intersecting aperture, of the rod having an angular end provided with a recess and a screw-point, the slidable disk, and the spring-actuated lever pivoted to said head and provided with a lug adapted to engage with the recess in said angular head, substantially as described.

In testimony that I claim the foregoing as my own I have hereunto affixed my signature in presence of two witnesses.

CHAS. S. HUNTER.

Witnesses:
JOHH H. BARR,
JAMES M. DOOLY.